United States Patent [19]

Marceau et al.

[11] 4,153,930
[45] May 8, 1979

[54] BALANCED CONTROL WAVEFORM FOR REDUCING INVERTER HARMONICS

[75] Inventors: Daniel J. Marceau, Springfield, Mass.; Robert M. Moriarty, Tolland, Conn.

[73] Assignee: United Technologies Corporation, Hartford, Conn.

[21] Appl. No.: 843,930

[22] Filed: Oct. 20, 1977

[51] Int. Cl.² ............................................. H02M 1/14
[52] U.S. Cl. .................................................... 363/42
[58] Field of Search ...................................... 363/39–42

[56] References Cited

U.S. PATENT DOCUMENTS

| | | | |
|---|---|---|---|
| 3,214,672 | 10/1965 | Watkins | 363/42 |
| 3,510,751 | 5/1970 | Resch | 363/42 |
| 3,614,590 | 10/1971 | Kernick | 363/42 |
| 3,715,649 | 2/1973 | Ravas | 363/42 |

Primary Examiner—William M. Shoop
Attorney, Agent, or Firm—Richard P. Lange

[57] ABSTRACT

A particular control waveform actuates the half-bridge switching elements of a three-phase power inverter in such a manner as to balance harmonic cancellation between waveform notching and low impedance filtering in obtaining a substantial sinusoidal output signal. The control waveform allows a small amount of lower order harmonics which inherently decreases the higher order harmonics generated by the notches in the control waveform so that a small filter, e.g., a five percent filter, can be used which eliminates the need for voltage regulation under various current loads and yet both the unregulated voltage fluxations and overall harmonic content of the output signal is well within acceptable tolerances for use by an electrical power utility or the like. At the same time, the control waveform employs a relatively low per cycle switching rate which minimizes the number of off-on transitions of each of the high-current, solid state switches in the inverter thereby retaining high inverter efficiency.

9 Claims, 4 Drawing Figures

BALANCED CONTROL WAVEFORM FOR REDUCING INVERTER HARMONICS

BACKGROUND OF THE INVENTION

1. Field of the Invention

This invention relates to a three-phase, half-bridge power inverter, and more particularly, to a unique control waveform for switching the poles of an inverter to balance harmonic cancellation between waveform notching and low impedance filtering.

2. Description of the Prior Art

Power inverters are known generally and are devices which serve to transform DC (direct-current) electrical energy, such as from a fuel cell or the like, into AC (alternating current) electrical energy which is the primary form used by power utilities. Such devices most often include one pair of switches, called a pole, connected as a half-bridge or full bridge in series across the positive and negative busses from the DC energy source. By actuating the switches in each pole, a series of positive and negative going pulses are formed with have a primary component corresponding to the fundamental desired AC sinusoidal waveform. Generation of AC electrical energy by such means inherently results in the generation of the harmonic components in addition to the fundamental AC sinusoid which must be removed or suppressed by some means before the load current can be supplied to an AC device or an electric power untility. Although numerous techniques for reducing the harmonic content in an inverter output have been proposed, a combination of pulsed-width modulation together with some in-line filtering has resulted in a relatively high-quality sinusoidal output signal.

With the advent of solid state technology to the inverter field, power switching devices such as power transistors, thyristors, etc., and integrated circuits have allowed a significant reduction in inverter components, size and weight. The filters employed in an inverter circuit tend to be one of the more costly and weighty items resulting in the development of numerous techniques which minimize the amount of filtering required to synthesize an acceptable AC waveform. In addition, the use of high impedance filters to remove harmonics requires a large series coupled inductor and voltage regulation is normally necessary to compensate for the voltage drop across this inductor as the loading on the inverter varies.

In U.S. Pat. No. 3,614,590 issed Oct. 19, 1971 to A. Kernick a solid state inverter is described utilizing a digitally derived control waveform for the full bridge power switching devices. The controlling waveform utilizes voltage pulses of uniform width interdispersed by spaces which may be of nonuniform width all produced relative to the integral number of equal increments. As indicated in FIG. 4 of this reference, a number of programmed waveforms are disclosed for the switching devices which serve to reduce the harmonics in the inverter output.

SUMMARY OF THE INVENTION

The primary object of the present invention is to provide a DC-to-AC electrical power inverter with solid state switches with a minimum amount of control circuitry and load current filtering which can be manufactured at a low dollar-per-kilowatt cost.

According to the present invention, a digital circuit provides a programmed switching pattern for controlling the high current solid state switching elements of a DC-to-AC electrical power inverter such that the low and high order harmonics in the inverter output are brought within acceptable limits by balancing the notching in the programmed pattern to a low impedance inverter filter. At the same time the three-phase power inverter employs solid state switching elements configured as low cost half-bridges which are actuated at a low switching rate so that the inverter efficiency remains high for low dollar per kilowatt initial cost.

According to the present invention, a low cost, high efficiency DC-to-AC power inverter employs a low impedance output filter so that no voltage regulation is required over the load range of the inverter. According to the present invention, a novel programmed switching waveform for the solid state half-bridge switching elements of a power inverter is disclosed which creates certain low order harmonics in order to reduce the magnitude of the higher order harmonics thereby minimizing the circulating current in the three-phase output filter.

According to the present invention, a particular control is uniquely balanced to a low impedance filter so that no regulation is required over the inverter load range. The control waveform actuates the solid state switches, configured as a three-phase half-bridge inverter, at a low per cycle rate in order to maintain high inverter efficiency.

Other objects, features, advantages of the present invention will become more apparent in light of the following description of a preferred embodiment, as illustrated in the accompanying drawing.

DETAILED DESCRIPTION OF THE PREFERRED EMBODIMENT

Figure 1:
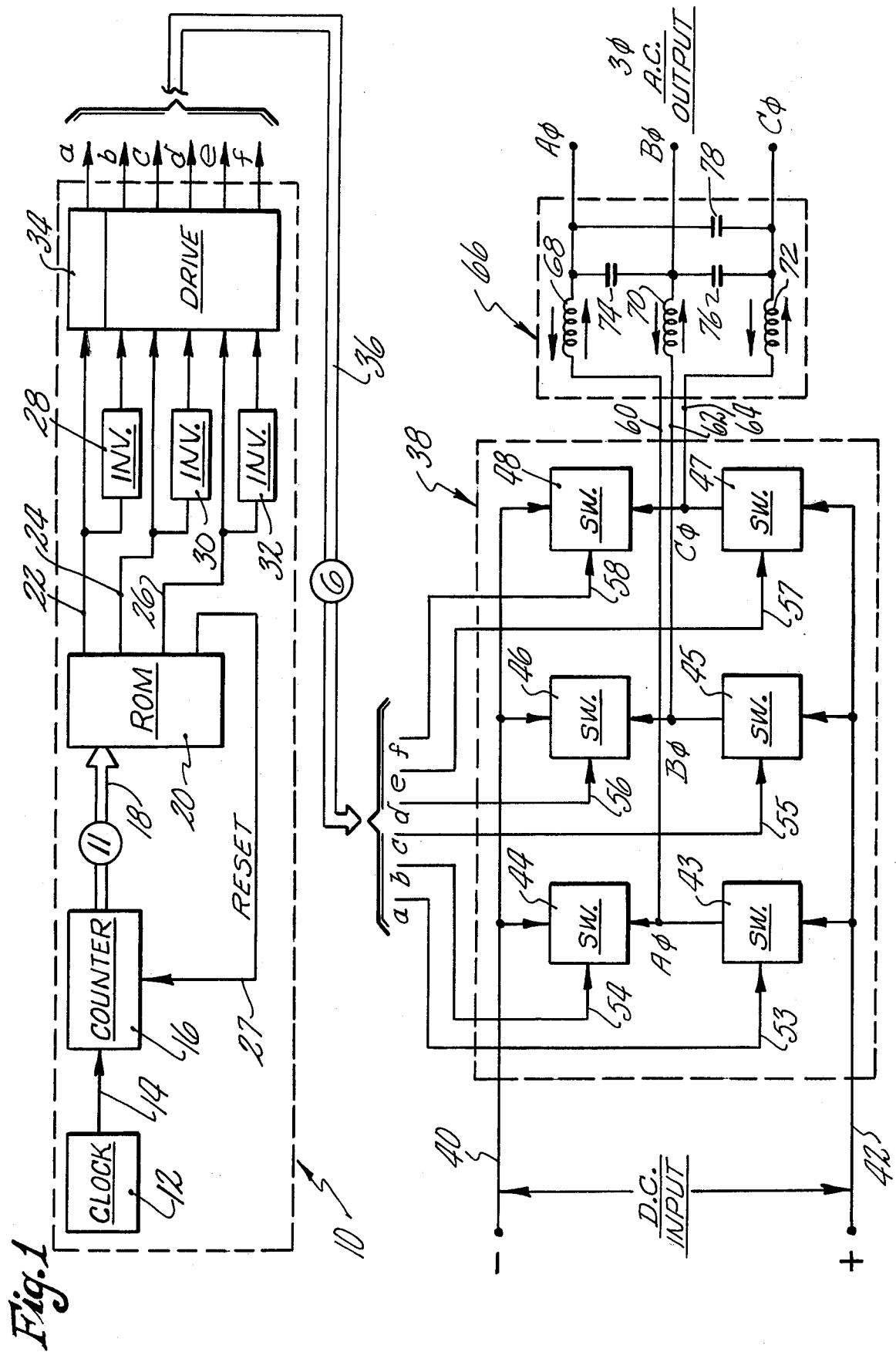
FIG. 1 is a block diagram of a circuit configuration according to the present invention shown driving a conventional half-bridge three-phase power inverter.

Referring initially to FIG. 1, one embodiment of a waveform generator 10 according to the present invention is illustrated and it is suitable for generating a repetitive series of programmed waveforms which are suitable for controlling the conduction sequences of a three-phase AC power inverter. In preferred form, waveform generator 10 comprises a digital clock 12 which generates a series of repetitive pulses at a predetermined frequency which are related to the fundamental frequency of the output signal from the inverter. For example, if an output signal with a frequency of 60 hertz is desired, the pulse rate of clock 12 would be selected as a multiple of the 60 hertz frequency, in order that each of the 360 electrical degrees in the fundamental frequency will comprise an equal number of clock output pulses. In the present invention, this pulse rate is selected to be 172.8 kHz.

The clock 12 is connected by line 14 to a counter 16 which functions to count the individual pulses generated by clock 12 and to generate a series of frequency related square waves, each being related to the others in the known manner, on a plurality of output lines. The counter 16 includes a reset terminal 27 which, when fed with an appropriate signal, returns the bistable circuits to their initial or zero state. The output of the counter 16 is connected to via a line 18 with multiple conductors to the inputs of a ROM (read only memory) 20 so that the discrete locations therein can be sequentially addressed in the usual fashion.

Figure 2:
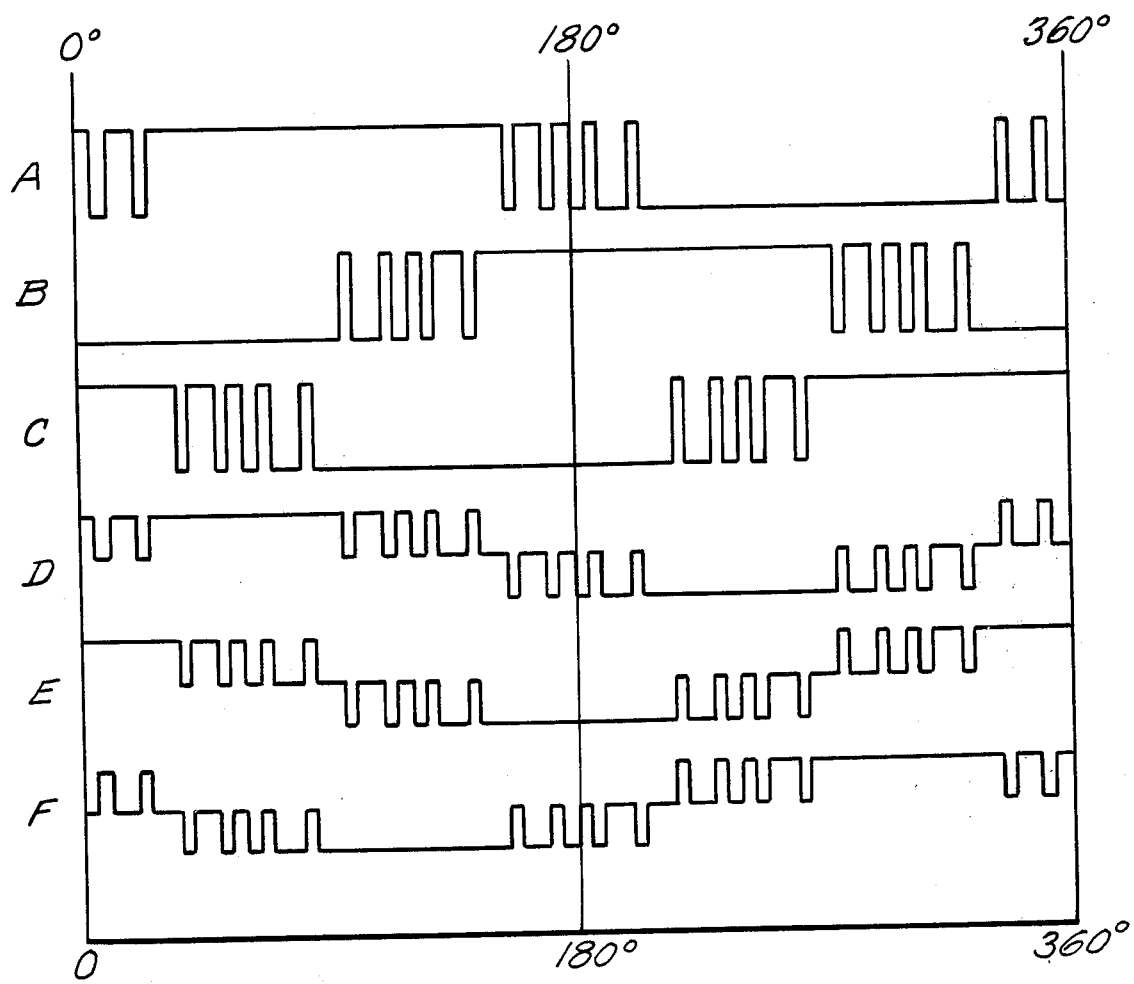
FIG. 2 is a graph illustrating the control waveform applied to the switching devices and the unfiltered voltage output waveform of the embodiment of FIG. 1.

Referring additionally to FIGS. 2a, 2b and 2c there is illustrated the programmed waveforms which are generated on the lines 22, 24 and 26 by the ROM 20. A reset pulse is periodically provided on line 27 at a time corresponding to the end of each full cycle of the fundamental to reset the counter 16. As can be noted, the programmed waveform includes pulses of nonuniform widths and it contains nine transition or switching points in each one-half cycle of the fundamental. The programmed waveform during the last half cycle, i.e. 180°–360° electrical degrees, corresponds to the inverse of the first one-half cycle, i.e. 0°–180° electrical degrees. Digital inverters 28, 30 and 32 are connected to the lines 22, 24 and 26, respectively, and serve to provide an inverted waveform of each of the programmed waveforms provided by the ROM 20. A drive cicuit 34 receives each of the programmed waveforms and develops a signal from each programmed waveform suitable for driving the switching elements of an inverter.

An important aspect of the present invention is to provide a DC-to-AC power inverter design together with a control system which can be manufactured at a low cost per kilowatt.

The control signals from the drive circuit 34 are connected by a multiconductor line 36 to an inverter 38. The inverter 38 is a three-phase, DC-to-AC inverter of the type well known to those of ordinary skill and it includes a negative and positive input bus 40 and 42, respectively, to which an external source of DC electrical power (not shown) such as a fuel cell or the like, is connected. Three pairs of high power solid state switches 43, 44 and 45, 46 and 47, 48 are provided and each pair of switches is connected as shown between the negative input bus 40 and the positive bus 42 for the purpose of converting the DC electrical power. This half-bridge arrangement is used since only two switching elements are required in each pole. The switches of each pole are never simultaneously conducting in that this would cause a "shoot through" which is in essence a short circuit between the negative and positive busses thereby causing a current surge which could damage the DC power source or the solid state switches or both. Alternatively, in the ideal situation the switching elements of each series coupled pairs are never simultaneously nonconductive or cut off since this would serve to instantaneously interrupt the power flow from the DC source to the load thereby reducing efficiency. Each of the switches 43-48 includes a control terminal 53-58, respectively, which serves to selectively render the solid state switch conductive or nonconductive depending on the state of the control signal.

Lines 60, 62 and 64 are connected to the lines coupling series-connected switches 43 and 44, 45 and 46, 47 and 48, respectively, and conduct the load current from the switching elements. A low pass filter 66 is connected to receive the load current flowing through the switches for synthesizing a sinusoidal output voltage signal and it includes an inductance 68, inductance 70, and inductance 72 series coupled in the lines 60, 62 and 64, respectively. The low pass filter 66 also includes a capacitor 74 connected across lines 60, 62, capacitor 78 connected across lines 60, 64 and capacitor 76 connected across lines 62, 64. Although the low pass filter 66 is of a conventional design, it will be appreciated by those of ordinary skill in the art that a low impedance and thus low cost filter can be used in the inverter configuration of the present invention by employing the particular balanced programmed switching waveform described herein. This is in part because rather than employing a switching pattern in which the notches or switch points are selected to reduce the lower harmonics as much as possible and thereby increase the higher order harmonics, the present invention allows select magnitudes of lower order harmonics which in turn reduces the higher order harmonics so that a low impedance filter, e.g., a five percent filter, can be used to finally synthesize the fundamental sinusoidal signal. For the purpose of understanding the operation of the present invention, it will be understood that the phase of the waveform appearing on each line of conventional three-phase AC electrical power differs by 120 electrical degrees and thus this phase relationship is established by the programmed waveforms the ROM 20 as shown in FIG. 2a–2c. Accordingly, the programmed waveform fed to each pair of switches is identical except for their phase displacement which corresponds to 120 electrical degrees of the fundamental frequency.

It will also be observed that the programmed waveform of the present invention is identical for each half cycle and it includes nine transitions for switching points which selectively render each switch between conducting and nonconducting states. The precise optimum transition points for the balance between the notching and the filter are indicated in the following chart and they are given in electrical degrees with respect to the fundamental signal.

| WAVEFORM PARAMETERS | |
|---|---|
| Switching Point | Electrical Degrees |
| 1 | 5.125 |
| 2 | 9.875 |
| 3 | 21.5 |
| 4 | 23.5 |
| 5 | 156.5 |
| 6 | 158.5 |
| 7 | 170.125 |
| 8 | 174.875 |
| 9 | 180. |

In operation, as is seen in FIG. 2a, at time T=0 the switch 43 is in its conducting state while switch 44 is turned off connecting the positive DC input bus to line 60. At the phase most closely corresponding to 5.125 electrical degrees incremented by the clock 12 through the counter 16, the logic condition on line 22 at the output of ROM 20 reaches the first point and it changes state gating the switch 43 into its nonconducting state, and at the same time gating the switch 44 into its conducting state. In this condition the negative DC input bus 40 is connected to the line 60 changing its potential to that of the negative input voltage. These transitions continue through 180 electrical degrees under the control of the ROM 20 and the conduction state of each of the switches 43 and 44 is alternated at the transition points indicated in the table for the positive half cycle. At T=180 electrical degrees, this pattern is reversed and the switch 43 is nonconductive through the first period while the switch 44 conducts. During the second half cycle, i.e., 180°-360°, the inverse programmed waveform is presented by the ROM 20 to line 22 thus rendering the switches 43 and 44 alternately conductive and nonconductive at precisely the same electrical transition points for the negative half cycle. As is seen in FIG. 2D, the selective activation of the switches 43, 44 and 45, 46 in accordance with the programmed waveform of the present invention causes the depicted voltage to appear across the lines 60, 62. In a similar manner, the selective activation of switches 45, 46 and switches 47, 48 by the similar, but phas displaced, programmed waveform emanating from the ROM 20 on lines 24 and 26 causes the waveform illustrated in FIG. 2E to appear across lines 62, 64. Also, the selective activation of switches 47, 48 and switches 43, 44 by another similar, but phase displaced programmed waveform caused the waveform illustrated in FIG. 2F to appear across lines 64, 60. As will be appreciated, it is the precise width, location and number of notchs in the programmed waveform which determines the nature and content of the harmonics in the inverter output signal. At the same time the number of transition or switching points is proportional to the efficiency of the inverter, i.e., the fewer times the switching elements of the inverter are turned off and on, the higher the inverter efficiency.

A three-phase, low impedance filter 66 is connected to lines 60, 62 and 64 to synthesize the pulses appearing thereon into a sinusoidal waveform in the manner well known to those of ordinary skill. As will be appreciated, the components making up the filter 66 are carefully balanced with the waveform fed to the solid state switches 43-48 in order that the overall harmonic content of the sinusoidal inverter output over the entire inverter load range does not exceed predetermined tolerances. As described herebefore, the filter 66 comprises chokes 68, 70 and 72 series coupled in lines 60, 62 and 64, respectively, and capacitors 74, 76 and 78 connected across lines 60-62, 62-64 and 64-60, respectively. Most three-phase prior art inverters have employed a high impedance filter at the inverter output to remove the large magnitude higher order harmonics which would otherwise distort the sinusoidal nature of the fundamental output signal. Such high impedance filters include a large series coupled inductor in the output line which has a high series impedance at the fundamental frequency. Accordingly, over the current load range of the inverter the voltage drop across this inductor is reflected by a corresponding change in the line-to-line voltage presented to a load. One way to compensate for this voltage variation has been to regulate the effective output voltage by changes in the programmed waveform supplied to the switching or a change in the DC voltage or a combination of both. This method, in addition to changing the harmonic components in the inverter output, involves an expensive and elaborate control system to monitor the output voltage and make the necessary adjustments in the control pattern applied to the switching elements. However, the filter 66 of the present invention presents a low series impedance to the load current so that the variation in output voltage is no more than 5 percent from no load to full load. Since this is within acceptable tolerances for use by most public utilities or the like, no further voltage regulation need be provided. However, if less voltage deviation over the load range is desired or if the DC input voltage drops as a function of load, low cost open loop voltage regulation can be provided to raise the DC input voltage a proportional amount with respect to changes in the output current load. This type of regulation is simple and well known to those in the art and can be introduced quite inexpensively into the inverter disclosed in the present invention.

Figure 3:
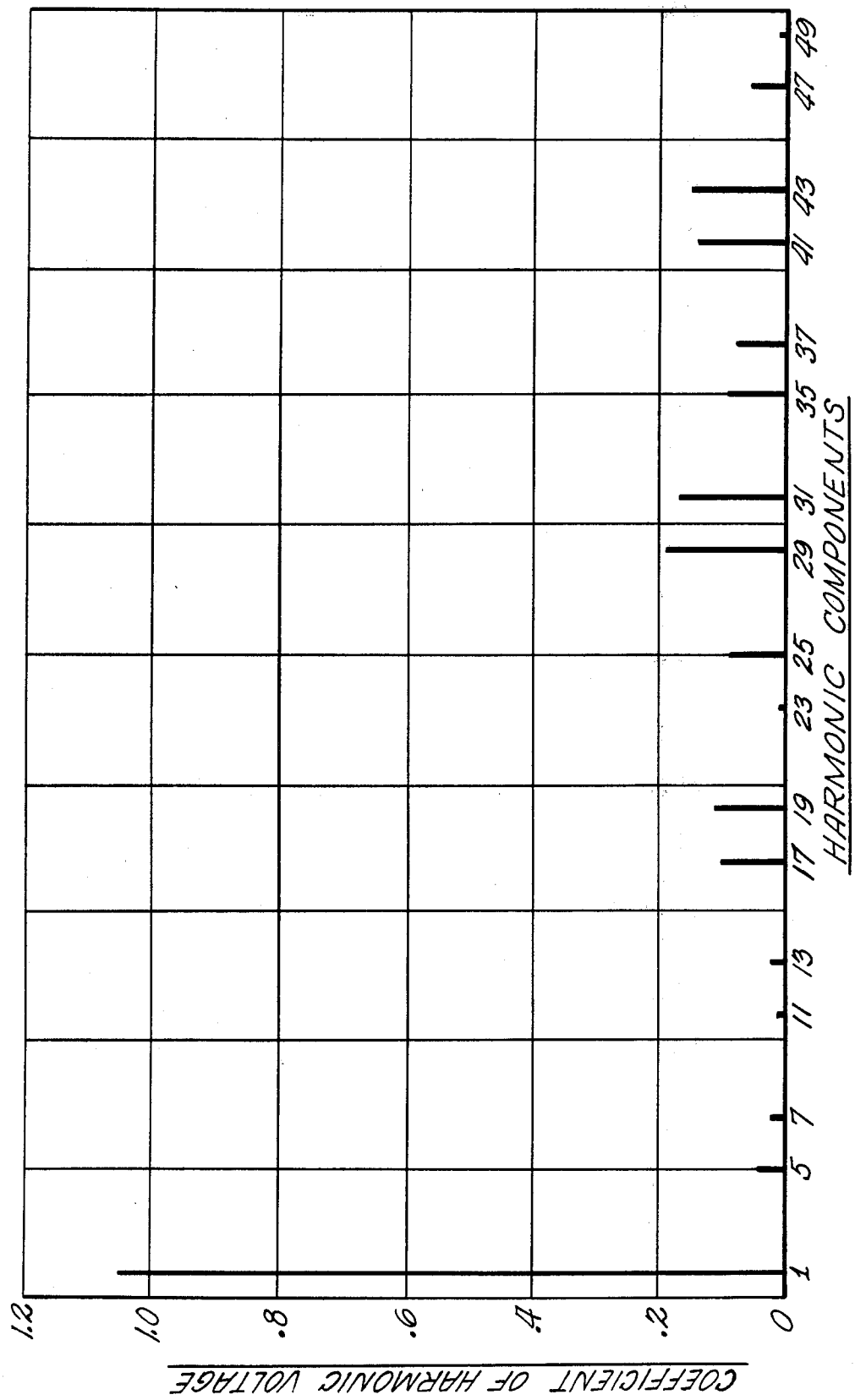
FIG. 3 is a graph illustrating the line-to-line magnitudes of the harmonic components in the inverter output.

Another significant advantage of the present invention is that the programmed waveform also minimizes the magnitude of instantaneous current pulses passing through the switching elements in the inverter beyond that required for supplying the load current. Referring to FIG. 3, a graph of the magnitudes of the harmonics, through the 49th harmonic, is seen. The lower magnitude of higher order harmonics generated by the actuation of the switching elements in accordance with the programmed waveform of the present invention minimizes the peak current carrying requirement imposed on the filter 66, the solid state switching devices 43-48 and the DC power source itself. Since all of the components of the inverter must be designed with the peak current demand in mind and this particular factor is most often directly proportional to the cost of the components, particularly the solid state switches, it is apparent that a low peak current requirement can significantly reduce the overall cost-per-kilowatt in the manufacture of the inverter. Furthermore, the lower magnitude of high order harmonic also reduces the circulating current in the filter 66.

Figure 4:
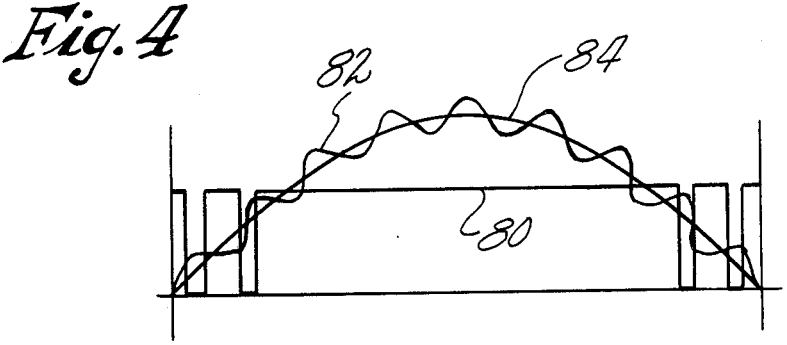
FIG. 4 is a graphic illustration showing the particular programmed waveform according to the present invention together with one-half cycle of the output voltage waveform of the inverter.

Finally, referring to FIG. 4, there is seen a graphic illustration of the programmed control waveform superimposed on a one-half cycle segment of the fundamental, e.g., 0°-180° electrical degrees, and an illustration of the actual filter output waveform under operating conditions. It will be appreciated that the combined effect of the notches in the control waveform 80 with a small amount of low impedance filtering renders the final shape of the output signal 82 substantially sinusoidal with respect to the fundamental 84.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A power inverter for converting electrical energy from a DC source to a substantially sinusoidal waveform having a positive-going half cycle and a negative-going half cycle, comprising:
  input means for receiving DC electrical energy from a source having a negative and positive input signal,
  switch means capable of being reduced conductive and non-conductive in response to the state of an actuating signal applied to a control terminal,
  control means connected to said switch means for generating a repetitive waveform from which said actuating signal is derived, said repetitive waveform including notches disposed at the beginning and end portions thereof which are adapted to actuate said switch means in such a manner as to form a fundamental of said sinusoidal waveform together with certain lower order harmonics and other higher order harmonics, and filter means coupled to said switching means for removing the higher order harmonics thereby rendering said fundamental signal substantially sinusoidal.

2. A power inverter according to claim 1, wherein said control means further includes a memory means in which said programmed waveform is stored in discrete addressable locations, and wherein said control means further includes a clock means for providing an output signal related to the fundamental frequency of said AC signal and a counting means for sequentially addressing the discrete locations in said memory means.

3. A power inverter according to claim 2, wherein said memory means generates a series of programmed waveforms, each being phase related to the other by 120 electrical degrees, and wherein said switch means includes three pairs of switches coupled to provide the negative and positive pulses on three separate lines, and wherein each switch of said pairs of switches is rendered alternatively conductive and nonconductive in accordance with the programmed waveform thereby providing a series of positive and negative pulses on said separate line at a phase relationship of 120 electrical degrees with respect to each other.

4. A power inverter according to claim 1, wherein said filter means is a five percent filter.

5. A power inverter according to claim 3, wherein said filter means comprises an inductor coupled in series in each of said lines and a capacitor coupled across each of said lines for receiving said negative and positive pulses.

6. A power inverter according to claim 1, wherein said input means includes a positive bus and a negative bus which receive electrical energy from said DC source, and wherein said switch means includes a pair of switches connected in series across said negative and positive busses, one of said switch means receiving an inverted form of said repetitive waveform from said control means so that one of said switches is rendered conductive while the other is rendered non-conductive.

7. An inverter according to claim 1, wherein said programmed waveform has at least two notches disposed at the beginning portion of each of said half cycles and two notches disposed at the end portion of each of said half cycles.

8. A power inverter according to claim 7, wherein said repetitive waveform corresponds to 180 electrical degrees and wherein said notches are switch points and occur at:

| WAVEFORM PARAMETERS | |
|---|---|
| Switching Point | Electrical Degrees |
| 1 | 5.125 |
| 2 | 9.875 |
| 3 | 21.5 |
| 4 | 23.5 |
| 5 | 156.5 |
| 6 | 158.5 |
| 7 | 170.125 |
| 8 | 174.875 |
| 9 | 180. |

9. A three-phase power inverter for converting electrical energy from a DC source having a positive signal and a negative signal to a substantially sinusoidal waveform having 360 electrical degrees which is suitable for use by electric power utilities or the like, comprising:

input means for receiving DC electrical energy from a source, switch means having at last three legs, each including a pair of switches connected in series across said negative and positive inputs which can be rendered alternatively conductive and non-conductive in response to the state of an actuating signal applied to a control terminal for generating a series of positive and negative pulses from said source of DC electrical energy, control means for generating a plurality of repetitive waveforms, each phased 120 degrees with respect to the other which are presented to said control terminals of each switch of said switching means, said programmed waveform having a particular series of notches therein which are adapted to form a fundamental sinusoidal signal with notched portions only near the 0 degree and 180 degree portion thereof, said control waveform allowing certain lower order harmonics in the inverter output while reducting the magnitude of certain higher order harmonics, and three-phase filter means coupled to each leg of said switching means for providing both a circulating path for tripling harmonics and for removing the higher order harmonics from the positive and negative pulses out of the switching means so that the signal waveform out of the inverter is substantially sinusoidal.

* * * * *

UNITED STATES PATENT AND TRADEMARK OFFICE
CERTIFICATE OF CORRECTION

PATENT NO. : 4,153,930

DATED : May 8, 1979

INVENTOR(S) : DANIEL J. MARCEAU & ROBERT M. MORIARTY

It is certified that error appears in the above-identified patent and that said Letters Patent are hereby corrected as shown below:

Column 1, line 22, change "with" to --which--.

Column 3, line 9, delete "to".

Column 4, line 27, after "waveforms" insert --from--.

Column 5, line 15, change "phas" to --phase--.

Column 5, line 23, change "notchs" to --notches--.

Column 6, line 59, change "reduced" to --rendered--.

Column 8, line 40, change "reducting" to --reducing--.

Signed and Sealed this

Twenty-fifth Day of September 1979

[SEAL]

Attest:

LUTRELLE F. PARKER

Attesting Officer     Acting Commissioner of Patents and Trademarks